July 31, 1928.
L. ZAIGER
1,678,688
WINDSHIELD WIPER
Filed March 12, 1928
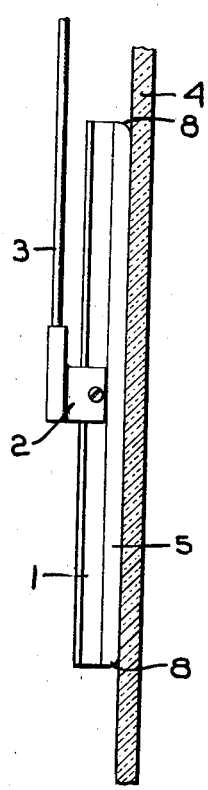
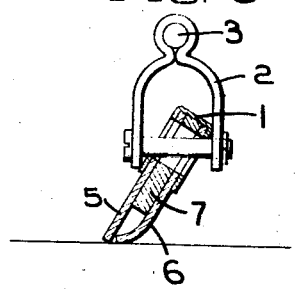
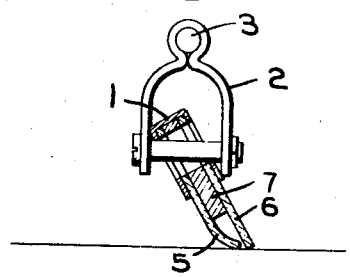
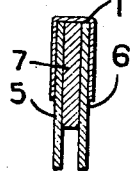
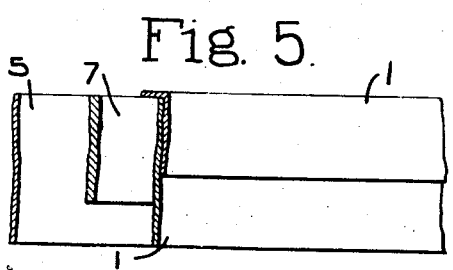
Inventor.
Louis Zaiger
by Heard Smith & Tennant.
Attys Patented July 31, 1928.

1,678,688

UNITED STATES PATENT OFFICE.

LOUIS ZAIGER, OF LYNN, MASSACHUSETTS.

WINDSHIELD WIPER.

Application filed March 12, 1928. Serial No. 261,017.

This invention relates to windshield wipers such as are used on motor vehicles for keeping the windshield clean. These windshield wipers are commonly made with a holder or backing strip U-shaped in cross section and with a flexible wiping element anchored between the legs of the U-shaped backing strip.

One of the objects of my present invention is to provide a novel windshield wiper of this type in which the wiping portion comprises two flexible strips spaced from each other and arranged so that during each wiping movement the leading strip will give the windshield a preliminary wiping, and the following strip will give the windshield a second or final wiping. In this way a better wiping effect is produced than is possible with a single wiping strip.

Other objects of the invention are to improve windshield wipers of this type in various ways all as will be more fully hereinafter set forth.

In order to give an understanding of the invention I have illustrated in the drawings a selected embodiment thereof which will now be described after which the novel features will be pointed out in the appended claims.

Fig. 1 is a side elevation of my improved wiper in contact with the glass of a windshield, which glass is shown in section;

Fig. 2 is an enlarged cross sectional view of the wiper shown in Fig. 1;

Fig. 3 is an enlarged sectional view showing the action of the wiper when moving in one direction;

Fig. 4 is a similar view showing the action of the wiper when moving in the opposite direction;

Fig. 5 is a fragmentary view partly in section illustrating my improved wiper.

As stated above the wiper is of that type which comprises a metal backing 1 U-shaped in cross section and which carries flexible wiping strips which will be presently described. The backing 1 is supported in a holder 2 which is carried on the end of a reciprocating or vibrating wiper arm 3 all as usual in windshield wipers. This arm 3 may be either manually or automatically operated. The wiper is so supported in the holder 2 that it has an inclined position relative to the glass 4 during its wiping movement, said wiper rocking or tipping over at the end of each movement so that when moving in one direction it has the position shown in Fig. 3 and when moving in the other direction has the position shown in Fig. 4, this being a common expedient in windshield wipers.

In my improved wiper the wiping action is effected by two flexible wiping strips 5 and 6 which may conveniently be made of rubber and which will preferably be relatively soft and flexible. These strips are anchored or retained between the side walls of the U-shaped holder 1 and project a sufficient distance beyond the holder to effect the wiping operation.

These two strips are of the same width and are spaced from each other by means of a spacing strip or ply 7 which may be of felt, rubber or any other suitable material. The spacing strip 7 is of less width than the wiping strips 5 and 6 so that the edges of the wiping strip project beyond the edges of the spacing strip.

At each wiping movement the wiper member stands at an inclination, as shown in Figs. 3 and 4, said wiper having the position shown in Fig. 3 when moving toward the right, and the position shown in Fig. 4 when moving toward the left, this being the manner in which these wipers usually operate. The two wiper strips 5 and 6 have such a relation to each other that during each movement they both have contact with the glass. During the movement to the right, Fig. 3, the wiping element 6 is flexed considerably while the wiping element 5 is flexed very little, if at all.

Because of the inclination at which the wiping element stands the leading wiping strip, which is the strip 6 in Fig. 3, bears against the glass with a greater pressure than the following strip 5. This leading strip provides the main wiping action on the glass and the following strip 5, which has a relatively light bearing against the glass, performs a second wiping operation, which is somewhat in the nature of a polishing operation. During the return movement as shown in Fig. 4, the wiping strip 5 becomes the leading strip which performs the main wiping operation and the strip 6 becomes the following strip which does the final or polishing operation. Therefore, at each movement both strips are operating against the glass, one strip performing the main wiping operation when the wiper is moving in one direction and the other strip performing such operation when the wiper is moving in the opposite direction.

In order to get this action it is important that the spacing strip 7 should be of the proper thickness in order to maintain the correct distance between the wiping strips 5 and 6, this thickness being so gauged as to enable the wiping strips to function as above described.

It will be noted that the intermediate spacing 7, which may conveniently be of felt, extends somewhat beyond the backing 1 but is somewhat narrower than the wiping strips. The edges of the rubber strips 5 and 6 which project beyond the spacing strip 7 are sufficiently flexible so that they will properly perform the ordinary wiping action but the spacing strip 7 provides sufficient reinforcement to the flexible strips so that they will be effective in cleaning wet snow from the windshield. A windshield embodying this invention might be described as having two degrees of flexure. The free edges of the strips 5 and 6 which project beyond the spacing strip 7 are relatively flexible and effectively perform the ordinary wiping operation when it is raining and it is desired to keep the windshield free from rain. But if snow, and especially wet snow, accumulates on the windshield, the resistance offered to the wiping strips is greater than that which is offered in ordinary operation. Under these circumstances the interposed spacing strip 7, which is considerably less resilient than the rubber strips, provides sufficient resistance to the wiping edge so that the accumulated snow will be carried across the windshield in front of the wiper.

For wiping the windshield when rain or moisture is accumulating on it a relatively delicate wiping action will suffice but if snow accumulates on the windshield then the wiping strips must have greater resistance.

My improved windshield wiper meets both of these conditions since the portions of the rubber strips 5 and 6 which project beyond the spacing strip 7 are relatively flexible while the spacing strip provides the added resistance to flexing movement necessary to effectively clean the windshield of snow.

If desired, I may make the corners of the wiping element somewhat rounded as shown at 8. The advantage of this is that the tipping action of the wiper is freer and there is no danger that the corners of the wiping strips will become caught and pulled out from the backing.

I claim:

1. A windshield wiper comprising a U-shaped backing member, flexible wiping strips mounted in said member and projecting beyond the edges thereof, a flexible spacer interposed between said wiping strips and spacing them from each other, said spacer projecting beyond the edges of said backing member and terminating short of the edges of said wiping strips, said spacer being of a sufficient thickness to maintain independence between said wiping strips whereby an advancing wiping strip will perform the main wiping operation while the following wiping strip will bear lightly against the windshield to perform a final wiping operation.

2. A windshield wiper comprising a U-shaped backing member, two flexible wiping strips of substantially the same width carried by said backing member and projecting beyond the edges thereof, and a flexible spacer interposed between said wiping strips and spacing them, said spacer projecting beyond the edges of said backing member and terminating short of the edges of said wiping strips, and so separating them that during each wiping stroke the advancing wiping strip will be bent around the spacer and will perform the main wiping operation while the following wiping strip will bear lightly against the glass and will perform the final wiping operation.

3. A windshield wiper comprising a U-shaped holder adapted to be so attached to a reciprocating arm as to permit said holder to rock at the end of each wiping stroke, flexible wiping strips carried by said holder and projecting beyond the edge thereof, a flexible spacer interposed between said wiping strips and spacing them from each other, said spacer projecting beyond the holder edge and terminating short of the edges of the wiping strips, to separate said wiping strips so that during each wiping stroke the advancing strip will be bent around the spacer to perform the main wiping operation while the following wiping strip will bear lightly against the glass to perform the final wiping operation, one wiping strip becoming the leading strip when the wiper is moving in one direction and the other becoming the leading strip when the wiper is moving in the other direction.

In testimony whereof, I have signed my name to this specification.

LOUIS ZAIGER.